(12) United States Patent
Maguire

(10) Patent No.: US 6,367,835 B1
(45) Date of Patent: Apr. 9, 2002

(54) AIR BAG MODULE HAVING COVER WITH AN AIR BAG RETAINER IN A CHAMBER IN THE COVER

(75) Inventor: William J. Maguire, Sterling Heights, MI (US)

(73) Assignee: TRW Vehicle Safety Systems Inc., Lyndhurst, OH (US)

(*) Notice: Subject to any disclaimer, the term of this patent is extended or adjusted under 35 U.S.C. 154(b) by 0 days.

(21) Appl. No.: 09/702,924

(22) Filed: Oct. 31, 2000

(51) Int. Cl.[7] .............................................. B60R 21/16
(52) U.S. Cl. ................................. 280/728.2; 280/728.3
(58) Field of Search ......................... 280/728.2, 728.3, 280/732, 728.1

(56) References Cited

U.S. PATENT DOCUMENTS

| | | |
|---|---|---|
| 3,656,790 A | 4/1972 | Truesdell |
| 3,778,085 A * | 12/1973 | Lipkin ..................... 280/728.3 |
| 5,344,182 A | 9/1994 | Lauritzen et al. |
| 5,425,550 A | 6/1995 | Paxton et al. |
| 5,454,586 A * | 10/1995 | Rogerson ................. 280/728.2 |
| 5,454,588 A | 10/1995 | Rose |
| 5,468,011 A * | 11/1995 | Donegan et al. ......... 280/728.2 |
| 5,470,101 A | 11/1995 | Ennis |
| 5,474,325 A | 12/1995 | Daines et al. |
| 5,484,165 A | 1/1996 | Jenkins et al. |
| 5,544,911 A | 8/1996 | Vine |
| 5,588,668 A * | 12/1996 | Emambakhsh ............... 280/732 |
| 5,639,111 A | 6/1997 | Spencer et al. |
| 5,658,008 A | 8/1997 | Herrmann et al. |
| 5,676,390 A * | 10/1997 | Olson ...................... 280/728.2 |
| 5,676,392 A | 10/1997 | Lunt et al. |
| 5,931,489 A | 8/1999 | Damman et al. |
| 5,931,491 A | 8/1999 | Bosgeiter et al. |
| 6,089,642 A * | 7/2000 | Davis, Jr. et al. ........ 280/728.3 |

* cited by examiner

Primary Examiner—Eric Culbreth
(74) Attorney, Agent, or Firm—Tarolli, Sundheim, Covell, Tummino & Szabo L.L.P.

(57) ABSTRACT

An apparatus (10) helps to protect an occupant of a vehicled. The apparatus (10) includes an inflatable vehicle occupant protection device (20) having a retainer portion (22). The inflatable vehicle occupant protection device (20) inflates in a primary direction toward a vehicle occupant. A reaction can (12) has an opening (13) through which the inflatable vehicle occupant protection device (20) inflates. The reaction can (12) further has at least one channel portion (60). The channel portion (60) secures the retainer portion (22) of the inflatable vehicle occupant protection device (20) against movement in the primary direction. A cover (14) closes the opening (13). The cover (14) has at least one projection (90). The projection (90) defines a chamber (99) that receives the retainer portion (22) of the inflatable vehicle occupant protection device (20). The projection (90) of the cover (14) and the retainer portion (22) are located in the channel portion (60) of the reaction can (12).

5 Claims, 4 Drawing Sheets

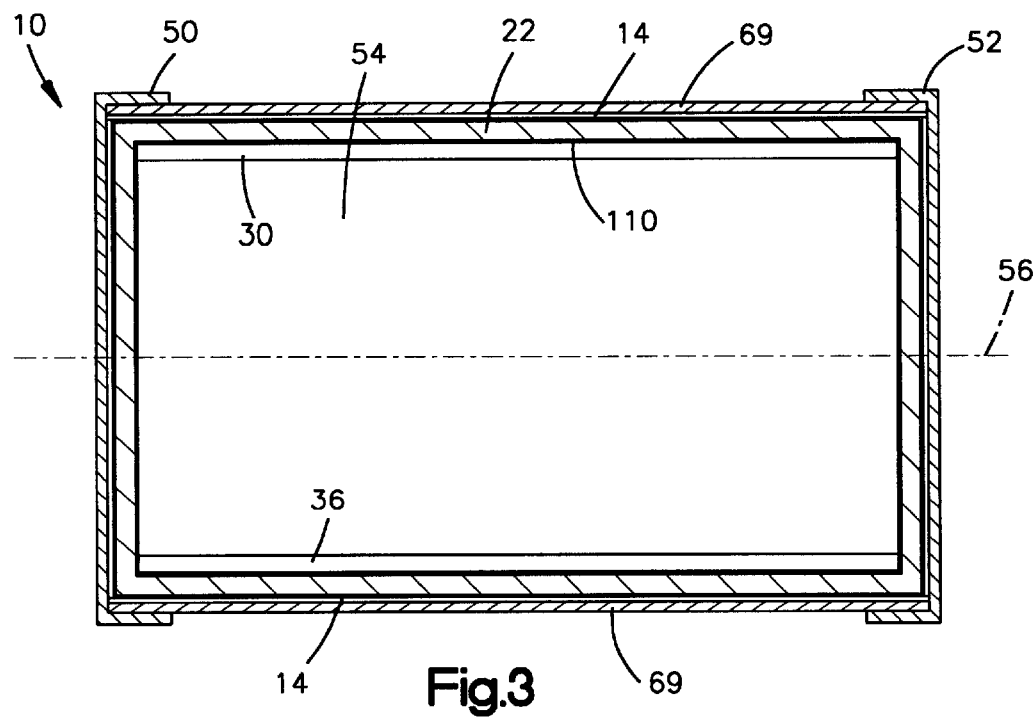
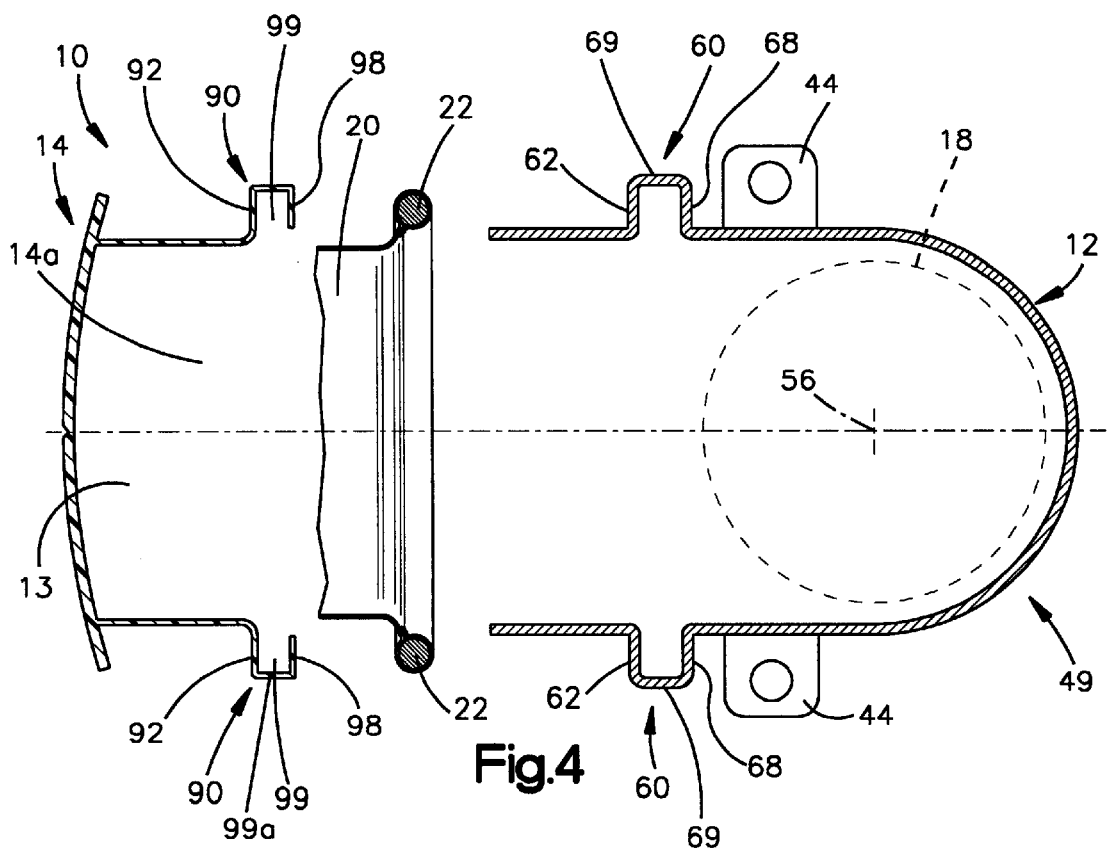

AIR BAG MODULE HAVING COVER WITH AN AIR BAG RETAINER IN A CHAMBER IN THE COVER

BACKGROUND OF THE INVENTION

1. Technical Field

The present invention relates to an apparatus for helping to protect an occupant of a vehicle and, in particular, the present invention relates to an air bag module including a reaction can, an air bag in the reaction can, and a cover for the reaction can.

2. Description of the Prior Art

A typical air bag module includes an air bag, an inflator for inflating the air bag, a reaction can for the air bag and the inflator, and a cover for the reaction can. The reaction can is connected with a portion of the vehicle, such as the vehicle instrument panel, and supports the air bag and the inflator in the vehicle. The cover conceals the reaction can and the air bag, and the cover is visible to an occupant of the vehicle. Fasteners typically interconnect the air bag, reaction can, and cover. In the event of a vehicle collision, the inflator is actuated to direct inflation fluid into the air bag. The air bag inflates into a position to help to protect a vehicle occupant from forcefully striking parts of the vehicle. As the air bag inflates, the air bag ruptures the cover.

SUMMARY OF THE INVENTION

The present invention is an apparatus to help protect an occupant of a vehicle. The apparatus includes an inflatable vehicle occupant protection device having a retainer. The inflatable vehicle a occupant protection device inflates in a primary direction toward a vehicle occupant. A reaction can has an opening through which the inflatable vehicle occupant protection device inflates. The reaction can further has at least one channel portion. The channel portion secures the retainer of the inflatable vehicle occupant protection device against movement in the primary direction. A cover closes the opening in the reaction can. The cover has at least one projection. The projection defines a chamber that receives the retainer of the inflatable vehicle occupant protection device. The projection of the cover and the retainer are located in the channel portion of the reaction can.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 3 is a sectional view of the apparatus of FIG. 1 taken along line 3—3 of FIG. 1;

FIG. 4 is an exploded view similar to FIG. 1;

DESCRIPTION OF A PREFERRED EMBODIMENT

Figure 1:
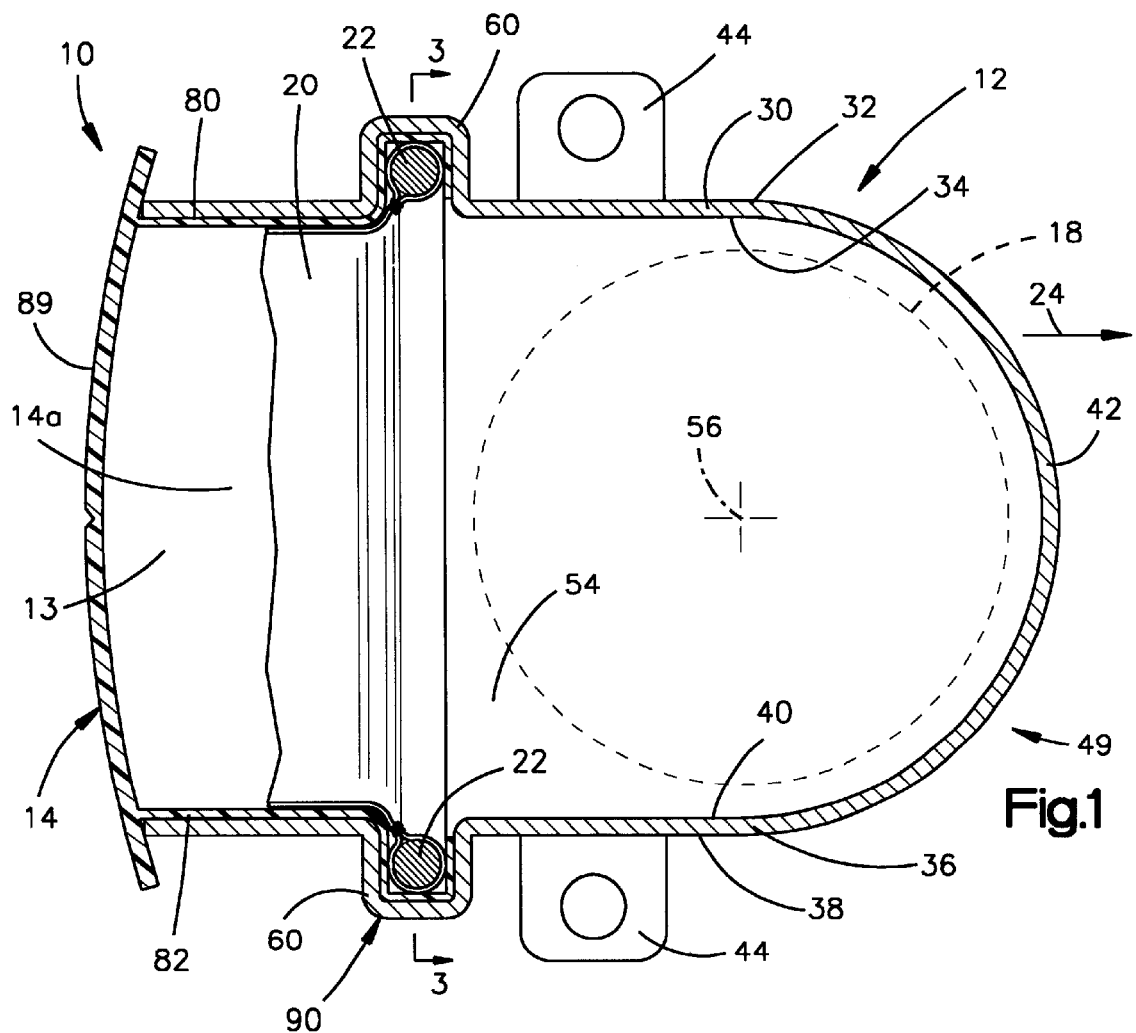
FIG. 1 is a schematic sectional view of a portion of an apparatus embodying the present invention.

The present invention relates to an apparatus for helping to protect an occupant of a vehicle. In particular, the present invention relates to an apparatus including an inflatable vehicle occupant protection device that is inflated to help to protect an occupant of a vehicle in the event of a vehicle collision. As representative of the present invention, FIG. 1 illustrates an apparatus for helping to protect an occupant of a vehicle. The apparatus comprises an air bag module 10.

The module 10 includes a reaction can (reaction canister) 12 and a cover 14. The reaction can 12 has an opening 13 that is closed by the cover 14. The reaction can 12 is mounted in a vehicle (not shown) in an orientation with the reaction can closer than the cover 14 to the front of the vehicle, that is, forward in the vehicle in the direction of forward travel of the vehicle shown by the arrow 24 in FIG. 1. The module 10 also includes an air bag 20, an inflator 18 (i.e., a source of inflation fluid) for inflating the air bag, and an air bag retaining structure, or retainer, 22 attached to the air bag. In the event of a vehicle collision, the inflator 18 is actuated to inflate the air bag 20. The air bag 20 inflates in a primary direction through the opening 13, thereby rupturing the cover 14. The primary direction is opposite the direction 24 of forward travel of the vehicle.

The retainer 22 (in plan view in FIG. 3) may be a generally rectangular member having a central opening through the member. The retainer 22 may be a wire having a circular cross-section as shown in FIG. 1 or a flat plate (not shown) that is rectangular in cross-section. As viewed in FIG. 2, the retainer 22 is a wire and has a circular cross-sectional configuration.

The reaction can 12 is preferably made of sheet metal. The reaction can 12 includes a generally planar upper wall 30 having an outer side surface 32 and an inner side surface 34. The reaction can 12 also includes a generally planar lower wall 36 spaced from and extending parallel to the upper wall 30. The lower wall 36 has an outer side surface 38 and an inner side surface 40. The inner side surface 40 of the lower wall 36 faces the inner side surface 34 of the upper wall 30.

Figure 5:
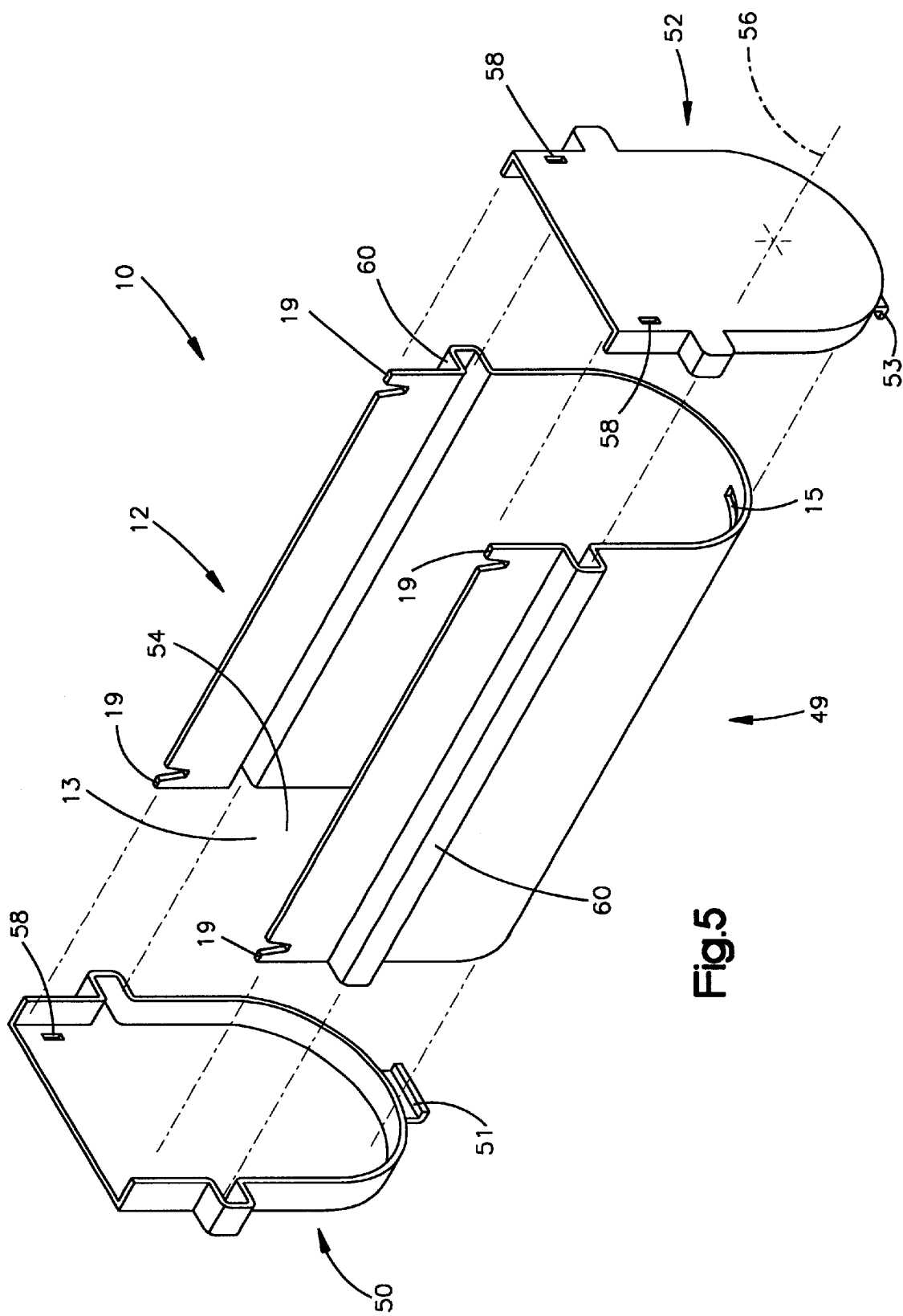
FIG. 5 is a schematic exploded view of a portion of the apparatus shown in FIG. 1.

The reaction can 12 further includes a curved central wall 42 extending between and interconnecting the upper wall 30 and the lower wall 36. The walls 30, 36 and 42 form a C-shaped part 49 (as shown in FIGS. 1, 4, & 5). The reaction can 12 also further includes mounting flanges or other mounting structures indicated schematically at 44 for securing the reaction can to the vehicle.

Opposed parallel end plates 50, 52 (FIGS. 3 & 5) of the reaction can 12 extend perpendicular to the upper and lower walls 30, 36 at opposite ends of the C-shaped part 49. The end plates 50, 52 are shaped to engage the ends of the part 49. The walls 30, 36, and 42 of part 49 and the end plates 50, 52 define an enclosed chamber 54 in the reaction can 12. An axis 56 of the module 10 extends longitudinally between the end plates 50, 52. In the illustrated embodiment, the axis 56 is disposed parallel to and equidistant between the upper and lower walls 30 and 36.

As viewed in FIG. 5, the end plates 50, 52 have extensions 51, 53 for securing the end plates to the part 49. The extensions 51, 53 are formed of the same material and are the same thickness as the remainder of the end plates 50, 52. The extensions 51, 53 are to be bent, or deformed, toward the C-shaped part 49 when the end plates 50, 52 are positioned on the ends of the part 49. The ends of the extensions 51, 53 are thereby inserted through slots 15 in the part 49.

The part 49 may have tabs 19 for inserting into corresponding slots 58 in the end plates 50, 52. The tabs 19 are twist tabs. After insertion into the slots 58, the tabs 19 are twisted 900 about a vertical axis from the position shown in FIG. 5. The extensions 51 and 53 and tabs 19 thus secure the end plates 51, 53 and the part 49 together.

The inflator 18 is disposed in the chamber 54 in the reaction can 12 adjacent to the central wall 42. The inflator 18 may be any known inflator and is illustrated as having an elongate cylindrical shape with a longitudinal axis that is coincident with the module axis 56. Opposite end portions of the inflator 18 are adjacent the end plates 50, 52. The inflator 18 may be secured within the reaction can 12 in any known manner. The inflator 18 has one or more fluid outlets (not shown) through which inflation fluid is directed, upon actuation of the inflator, into the chamber 54 to inflate the air bag 20.

Figure 2:
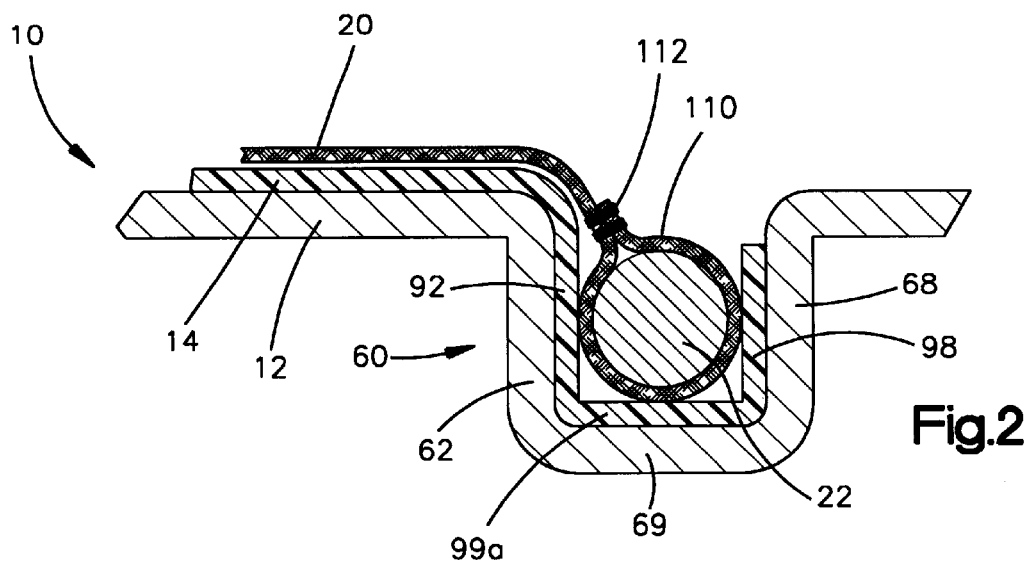
FIG. 2 is an enlarged view of a portion of FIG. 1.

The part 49 includes two channel portions 60, each of which has a generally rectangular cross-sectional configuration (FIGS. 1 and 2). The channel portions 60 are located toward the rearward end of the part 49 and extend axially along the length of the reaction can walls 30, 36 and outward away from the reaction can walls. A first wall 62 of each channel portion 60 extends outward from the respective walls 30, 36. A second wall 68 of each channel portion 60 also extends outward from the respective walls 30, 36. The first walls 62 of each channel portion 60 lie in the same plane, and the second walls 68 of each channel portion lie in the same plane. The plane in which the first walls 62 lie is parallel to the plane in which the second walls 68 lie.

A third wall 69 interconnects the first and second walls 62, 68 of each channel portion 60 at their outer terminal ends. The walls 62, 68, 69 define the channel portions 60. The channel portions 60 lie directly opposite to each other in the part 49. The part 49 is one piece, and the walls 30, 36, 62, 68, and 69 are portions of the one piece. The part 49 is thus not made of separate interconnected pieces.

The cover 14 conceals the air bag 20 and closes the opening 13 in the reaction can 12. The cover 14 is preferably made of a plastic material and has parallel upper and lower walls 80, 82 (FIG. 1). Preferably, the cover 14 is configured as, and forms, a portion of an instrument panel 89 of the vehicle and is thus visible to a vehicle occupant.

The cover 14 (FIGS. 1 and 4) includes two projections 90, each of which has a U-shaped cross-sectional configuration. The projections 90 are the forward most part of the cover 14 and extend axially along the entire length of the upper and lower walls 80, 82 of the cover and radially away from the upper and lower walls. Each of the projections 90 includes a first wall member 92 that extends generally perpendicular to the walls 80, 82 of the cover 14. A second wall member 98 of each projection 90 also extends generally perpendicular to the walls 80, 82. The first wall members 92 lie in the same plane, and the second wall members 98 lie in the same plane. The plane in which the first wall members 92 lie is parallel to the plane in which the second wall members 98 lie. The wall members 92 and 98 are interconnected at their outer terminal ends by an interconnection wall 99a of the cover 14. The first and second wall members 92, 98 and their interconnection walls 99a define chambers 99 for receiving the retainer 22 of the air bag 20.

The second wall member 98 of each projection 90 may be constructed as one piece with the first wall 92 and interconnection wall 99a and the other portions of the cover 14. Thus, the cover 14 is a one piece plastic part, as viewed in FIGS. 1 and 2. The cover 14 is not made of separate interconnected pieces.

The air bag 20, only portions of which are illustrated in the Figures, is folded and stored in a known manner in the reaction can 12. The folded air bag 20 may be located in a chamber portion 14a of the cover 14 that is received in the reaction can 12. Thus, the air bag 20 is located in the cover 14 and in the reaction can 12. The air bag 20 is made from a fabric material, preferably woven nylon. A portion 110 of the air bag 20 is wrapped around the retainer 22 and sewn at a stitching line or lines indicated schematically at 112 (FIG. 2) to secure the retainer 22 and air bag together.

As viewed in FIG. 2, the retainer 22 is a wire and has a circular cross-sectional configuration. The retainer 22 and the air bag portion 110 that is wrapped around the retainer 22 are closely fitted within the chamber 99 of each channel portion 90 (FIGS. 1 and 2) of the cover 14.

During assembly, the retainer 22, with the air bag portion 110 wrapped around the retainer, may be slid from one end of the cover 14 into the chambers 99 of the projections 90 of the cover. The second wall member 98 may be elastically deflected away from the first wall member 92 to facilitate this operation. This provides a unitary assembly of the air bag 20, retainer 22 and cover 14.

Figure 6:
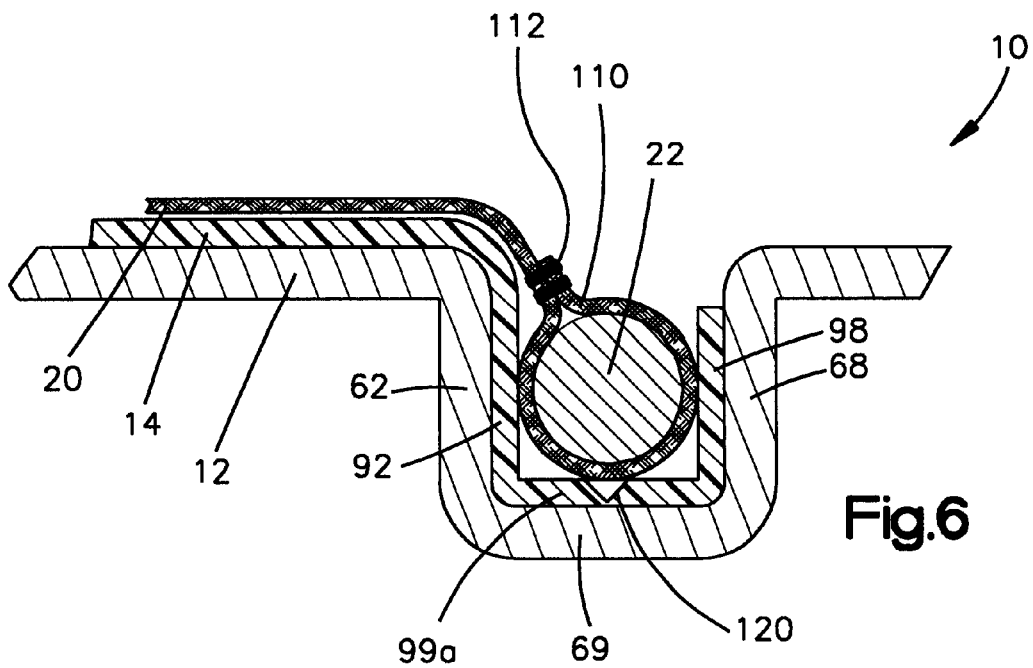
FIG. 6 is a schematic view similar to FIG. 2 showing an alternative feature of the apparatus.

The interconnection wall 99a of the cover 14 may include a living hinge 120 (FIG. 6). The hinge 120 facilitates assembly of the module 10 by allowing the second wall member 98 to pivot away from the first wall member 92 to facilitate insertion of the retainer 22 and air bag portion 110 into the chambers 99 from the forward end of the cover 14. The second wall member 98 may then be pivoted back toward the first wall member 92 to position the retainer 22 and air bag portion 110 within the chamber 99. Either one wall 99a or both walls 99a may have a hinge 120.

Figure 7:
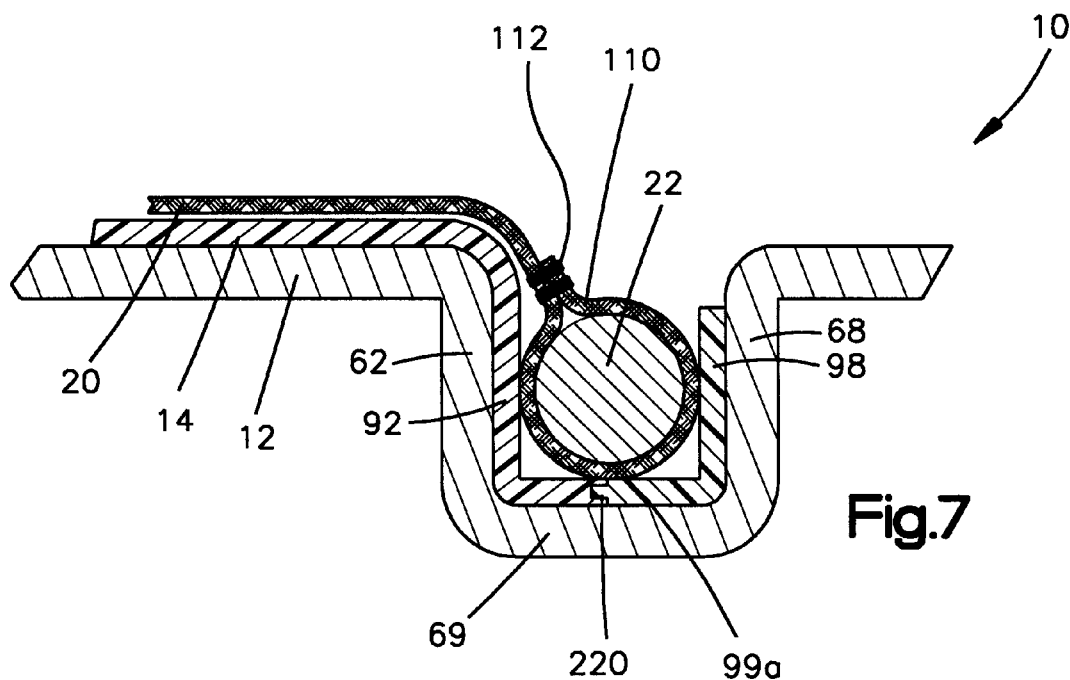
FIG. 7 is a schematic view similar to FIG. 2 showing another alternative feature of the apparatus.

As another alternative, the wall 99a may have a snap connection structure 220 (FIG. 7), which allows the second wall member 98 to be disconnected from the first wall member 92 and reconnected by the snap connection structure 220. The snap connection structure 220 may be of any suitable construction. When the second wall member 98 is disconnected from the first wall member 92, the retainer 22 and the air bag portion 110 are together inserted from the forward end of the cover 14 into the chamber 99. Either wall 99a or both walls 99a may have the snap connection structure.

After the retainer 22 and air bag portion 110 are positioned in the chambers 99 of the projections 90 of the cover 14, the projections 90 are axially slid within the channel portions 60 of the part 49 from either end of the part 49. The end plates 50, 52 are then secured to the part 49. The air bag module is thus assembled and may be mounted in a vehicle.

When the air bag 20 inflates, the retainer 22 and portion 110 of the air bag 18 are secured against movement in the primary direction of inflation of the air bag by the walls 62, 68, 69 defining the channel portions 60 in the reaction can 12.

The third wall 69 of each channel portion 60 of part 49 may be lanced or slit (not shown) to allow crimping of the channel portion 60. Such crimping moves the walls 62, 68 closer together to secure the cover 14, retainer 22, and air bag portion 110 more tightly within the channel portion 60 of the part 49 of the reaction can 12.

From the above description of the invention, those skilled in the art will perceive improvements, changes and modifications in the invention. Such improvements, changes and modifications within the skill of the art are intended to be covered by the appended claims.

I claim:

1. An apparatus for helping to protect an occupant of a vehicle, said apparatus comprising:

an inflatable vehicle occupant protection device having a retainer, said inflatable vehicle occupant protection device inflating in a primary direction toward a vehicle occupant;

a reaction can having an opening through which said inflatable vehicle occupant protection device inflates, said reaction can further having at least one channel portion, said channel portion securing said retainer of said inflatable vehicle occupant protection device against movement in the primary direction; and a cover for closing said opening of said reaction can, said cover having at least one projection, said projection defining a chamber receiving said retainer of said inflatable vehicle occupant protection device, said projection of said cover and said retainer being located in said channel portion of said reaction can, wherein said projection includes a first wall and a second wall interconnected by a third wall and said third wall includes a hinge for facilitating access to said chamber of said projection.

2. An apparatus for helping to protect an occupant of a vehicle, said apparatus comprising:

an inflatable vehicle occupant protection device having a retainer, said inflatable vehicle occupant protection device inflating in a primary direction toward a vehicle occupant;

a reaction can having an opening through which said inflatable vehicle occupant protection device inflates, said reaction can further having at least one channel portion, said channel portion securing said retainer of said inflatable vehicle occupant protection device against movement in the primary direction; and a cover for closing said opening of said reaction can, said cover having at least one projection, said projection defining a chamber receiving said retainer of said inflatable vehicle occupant protection device, said projection of said cover and said retainer being located in said channel portion of said reaction can, wherein said projection includes a first wall and a second wall interconnected by a third wall and said third wall includes a snap connection structure permitting disconnection of said second wall from said first wall and reconnection of said second wall to said first wall.

3. An apparatus for helping to protect an occupant of a vehicle, said apparatus comprising:

an inflatable vehicle occupant protection device having a retainer, said inflatable vehicle occupant protection device inflating in a primary direction toward a vehicle occupant;

a reaction can having an opening through which said inflatable vehicle occupant protection device inflates, said reaction can further having a channel structure including at least one channel portion; and a cover for closing said opening of said reaction can, said cover being made of plastic material and having at least one wall extending along a portion of said reaction can, said wall having a projection, said projection having a first wall and a second wall interconnected by a third wall and defining a chamber receiving said retainer of said inflatable vehicle occupant protection device, said projection of said cover and said retainer being located in said channel structure of said reaction can, said location of said projection of said cover and said retainer in said channel structure comprising the only structure securing said retainer of said inflatable vehicle occupant protection device against movement in the primary direction.

4. The apparatus as defined by claim 3 wherein said reaction can includes a C-shaped reaction can part having opposite ends and two end plates, said end plates comprising separate structures, one end plate being attached to each respective end of said C-shaped reaction can part to form a unitary structure.

5. The apparatus as defined by claim 4 wherein said channel structure includes a second channel portion of said reaction can disposed at a directly opposite location in said C-shaped reaction can part from said one channel portion.

* * * * *